(12) United States Patent
Jung et al.

(10) Patent No.: US 7,424,356 B2
(45) Date of Patent: Sep. 9, 2008

(54) METHOD AND DEVICE FOR REFERENCING AN INCREMENTAL TRAVEL SENSOR IN AN ELECTRONICALLY CONTROLLED ACTUATION DEVICE OF A CLUTCH

(75) Inventors: Mario Jung, Sinzheim (DE); Alexander Schweizer, Buehl (DE); Klaus Kuepper, Buehl (DE)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 295 days.

(21) Appl. No.: 11/160,678

(22) Filed: Jul. 5, 2005

(65) Prior Publication Data
US 2006/0009328 A1    Jan. 12, 2006

(30) Foreign Application Priority Data
Jul. 6, 2004   (DE)   ................ 10 2004 032 623

(51) Int. Cl.
*B60K 17/04*   (2006.01)
(52) U.S. Cl. ........................................ 701/67; 180/65.2
(58) Field of Classification Search .................. 701/51, 701/53, 66, 67; 477/73, 5, 74, 8, 83, 86, 477/174; 180/65.2, 65.8
See application file for complete search history.

(56) References Cited

U.S. PATENT DOCUMENTS

| | | | | |
|---|---|---|---|---|
| 5,679,099 A | * | 10/1997 | Kato et al. | .................. 477/176 |
| 5,850,898 A | * | 12/1998 | Bohme et al. | .............. 192/54.3 |
| 5,993,352 A | * | 11/1999 | Kosik et al. | .................... 477/74 |
| 6,105,448 A | * | 8/2000 | Borschert et al. | ............. 74/335 |
| 6,209,408 B1 | * | 4/2001 | DeJonge et al. | ............... 74/335 |
| 6,711,486 B1 | | 3/2004 | Karlsson et al. | ............... 701/67 |
| 6,817,965 B2 | * | 11/2004 | Tabata | ......................... 477/33 |
| 6,953,415 B2 | * | 10/2005 | Kadota | .......................... 477/5 |

FOREIGN PATENT DOCUMENTS

| | | |
|---|---|---|
| DE | 19953292 | 5/2001 |
| EP | 0856678 | 8/1998 |
| EP | 1450062 | 8/2004 |

* cited by examiner

*Primary Examiner*—Dalena Tran
(74) *Attorney, Agent, or Firm*—Simpson & Simpson, PLLC

(57) ABSTRACT

A method for referencing an incremental travel sensor in an electronically controlled actuation device of a clutch in the drive train of a traveling vehicle, the actuation device containing a memory in which a characteristic curve is stored that indicates the clutch torque as a function of the position of an actuation element, the method comprising the following steps: determining whether the clutch is slipping beyond a given threshold; if so, determining the current clutch torque; and determining the current position of the actuation element based on the current clutch torque and the characteristic curve. Additional methods are specified that facilitate a referencing according to requirements.

18 Claims, 4 Drawing Sheets

METHOD AND DEVICE FOR REFERENCING AN INCREMENTAL TRAVEL SENSOR IN AN ELECTRONICALLY CONTROLLED ACTUATION DEVICE OF A CLUTCH

CROSS REFERENCE TO RELATED APPLICATIONS

This application claims priority of German Patent Application No. 10 2004 032 623.1 filed Jul. 6, 2004, which application is incorporated herein by reference.

FIELD OF THE INVENTION

The invention relates to a method and a device for referencing an incremental travel sensor in an electronically controlled actuation device of a clutch in the drive train of a vehicle.

BACKGROUND OF THE INVENTION

Automatic clutches are increasingly being used in vehicles lately not just for comfort reasons but also to cut down on wear of the components. Actuation devices of such automatic clutches frequently contain an incremental sensor that automatically detects the travel of an actuation member of the clutch or the rotation of an actuator, such as an electric motor. For a precise control or regulation of the clutch actuation, it is necessary to know the exact position of the actuation member because the clutch in most cases is driven in such a manner that it is able to transmit a prescribed torque that is a function of the position of the actuation member. This clutch torque is saved in an electronic memory as a characteristic curve that is a function of the position of the actuation member. It is therefore necessary to compensate or reference the signal of the incremental sensor periodically, i.e., to adjust the actuation member to a set point or reference value to which the count of the incremental sensor may then be referred. This referencing normally occurs at a limit stop. In German Patent Application 199 53 292 A1, a method is described in which, as a function of various input signals, a decision is made about whether the referencing of the incremental travel measurement is to occur with the clutch engaged or disengaged.

The referencing of a clutch actuator at a limit stop assumes that, depending on the configuration of the clutch actuation, which may be accomplished in various ways, the clutch may either be fully engaged or fully disengaged. This complete engagement or disengagement of the clutch is only possible in certain situations, so time delays between request and the execution of a referencing cycle are inevitable.

BRIEF SUMMARY OF THE INVENTION

The object of the present invention is to specify a method and a device for carrying it out that permits a referencing as soon after the request as possible.

A first solution for achieving this objective is produced using a method for referencing an incremental sensor in an electronically controlled actuation device of a clutch in the drive train of a traveling vehicle, the actuation device containing a memory in which a characteristic curve is stored that indicates the clutch torque as a function of an actuation element position, the method including the following steps:

determining whether the clutch is slipping beyond a given threshold; if so determining the current clutch torque; and, determining the current position of the actuation element based on the current clutch torque and the characteristic curve.

Using the aforementioned method, the incremental travel sensor may be referenced, at least roughly, even when a vehicle is traveling.

The current clutch torque is advantageously determined according to the following equation:

$$MK = |MM - J \times \overline{\omega}|$$

wherein

MK=clutch torque

MM=engine torque

J=moment of inertia of the engine; and, $\overline{\omega}$=speed change of the engine over time.

The slip is advantageously calculated via a comparison of an engine speed on the clutch input side to a transmission input speed on the clutch output side.

While the engine speed is normally directly available, a sensor for the transmission input speed is not always present. In this case, the transmission input speed may be calculated from the instantaneous transmission ratio, the axle ratio and the instantaneous vehicle speed.

It is advantageous to set the current reference clutch torque to the current clutch torque after calculating this current clutch torque, so that there is no abrupt jump occurring in the clutch torque.

Another solution for achieving the object of the invention is produced using a method for referencing an incremental travel sensor in an electronically controlled actuation device of a clutch in the drive train of a traveling vehicle, the method including the following steps:

determining whether the clutch is slipping beyond a given threshold; if not determining whether a gear is engaged; if so, completely engaging the clutch until the actuation device reaches an engagement reference limit stop.

The aforementioned method may be carried out in a traveling vehicle if the clutch slips only slightly.

Another solution for achieving the object of the invention is produced using a method for referencing an incremental travel sensor in an electronically controlled actuation device of a clutch in the drive train of a traveling vehicle, the method including the following steps:

determining whether the clutch is slipping beyond a given threshold; if not determining whether a gear is engaged; if not, completely disengaging or engaging the clutch until the actuation device reaches a reference limit stop.

A slipping state below a given threshold may be produced by reducing the engine torque.

Since a rapid referencing cycle is possible after a reset, it is advantageous to memorize a current gear in an EEPROM of the actuation device after changing the gear.

In this context it is also advantageous to set an additional signal to "no gear" before the start of the disengagement of an old gear and to "gear" after engagement of a new gear.

Another solution for achieving the object of the invention lies in a method for referencing an incremental travel sensor in an electronically controlled actuation device of a clutch and at least one other incremental travel sensor in an electronically controlled actuation device of a transmission in a vehicle drive train after a reset, especially an undervoltage reset, the method including the following steps:

completely disengaging the clutch and referencing of the incremental travel sensor assigned to the clutch actuation device in the fully disengaged position of the clutch;

maintaining of the fully disengaged position of the clutch and referencing of the incremental travel sensor(s) assigned to the transmission actuation device;

shifting of the transmission into neutral; and, completely engaging the clutch and referencing of the incremental travel sensor assigned to the clutch actuation device in the fully engaged position of the clutch.

The methods of the invention do not have to be used exclusively in automated clutches of manual shift transmissions, automated manual transmissions, automatic transmissions or transmissions having a continuously variable transmission ratio, but also in parallel shift transmission or twin-clutch transmissions in which by engaging a clutch, one of two transmission branches is engaged so that the other transmission branch may be shifted when its clutch is disengaged.

The part of the object of the invention that is directed to the device is achieved using a device for referencing an incremental sensor in an electronically controlled actuation device of a clutch in the drive train of a vehicle, the actuation device including a microprocessor having a memorizing device in which is stored a characteristic curve that specifies the clutch torque as a function of the position of the actuation element and to which the incremental sensor, other sensors and at least one actuator of the actuator device are connected, programs being stored in the memorizing device in such a manner that the device carries out at least one of the methods according to one of the aforementioned claims.

BRIEF DESCRIPTION OF THE DRAWINGS

The invention is explained below using examples in reference to diagrammatic drawings and with additional details.

In the figures.

DETAILED DESCRIPTION OF THE INVENTION

Figure 1:
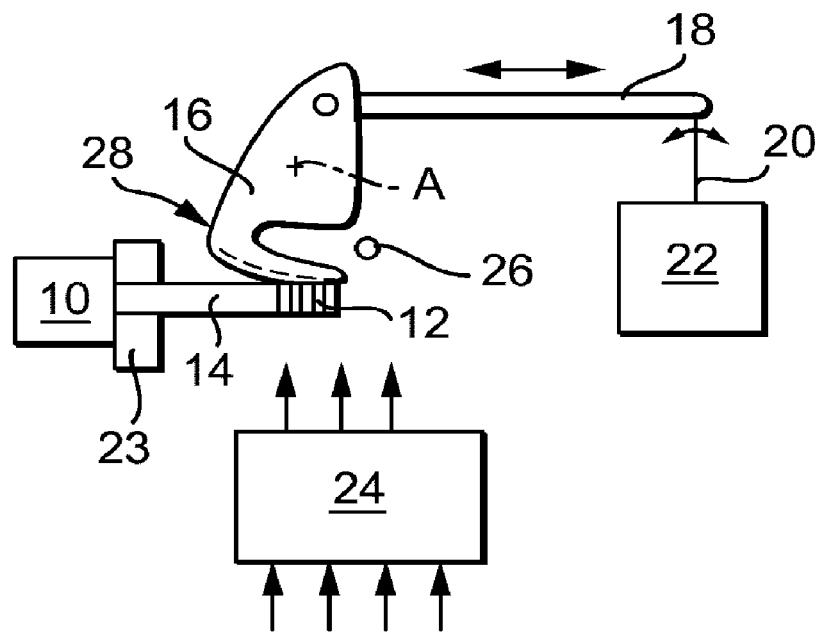
FIG. 1 shows a sketch of a clutch actuation device.

According to FIG. 1, a clutch actuation device that is known in its structure has an actuator 10, such as an electric motor, that gives rotary drive to a spindle 14 provided with a worm gearing 12. Worm gearing 12 engages in the teeth of a gear sector 16, which is swivel-mounted about an axis A and on which is mounted a transmission member 18 that is connected to a control element 20 of a clutch 22, for example, a disengagement lever.

The rotation of spindle 14 is detected by an incremental sensor 23, in the depicted example an incremental angle sensor, whose pulses are fed to an electronic controller 24. The gear sector 16 swivels about an angular range that is limited by limit stops 26 and 28, the one limit stop corresponding to the fully engaged position of clutch 22 and the other limit stop corresponding to the fully disengaged position of clutch 22. The reaching of a limit stop is detected by the controller that controls actuator 10 by virtue of incremental sensor 23 no longer outputting any pulses in spite of current being applied to the actuator. In this way, it is possible to reference the limit positions of the clutch or control element 20.

Inputs of the controller are connected to additional sensors (not depicted) of the drive train, such as a sensor for detecting the speed of a driving engine of the drive train, a sensor for detecting the gear ratio of the transmission (not shown), a sensor for detecting the speed of a transmission input shaft, a sensor for detecting the speed of the vehicle, etc. Outputs of controller 24 control actuator 10 and additional actuators, such as a select actuator and a shift actuator of an automated manual shift transmission.

The structure and the function of the described system are known in and of themselves and therefore are not explained.

Figure 2:
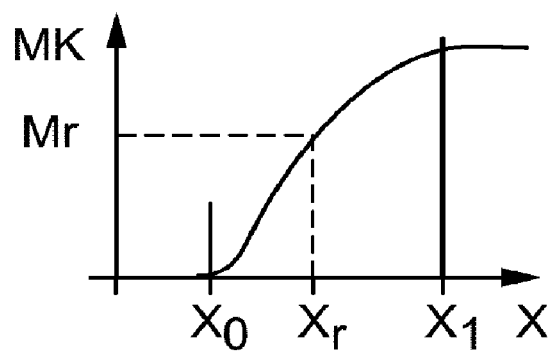
FIG. 2 shows a torque characteristic curve stored in a memory of the control device according to FIG. 1; and, FIGS. 3 to 5 show flow charts for explaining the method of the invention.

FIG. 2 shows a clutch torque characteristic curve stored in a memory of controller 24, the abscissa indicating position x of control element 20 and the ordinate indicating the clutch torque MK that is transmissible at the position. Position $x_0$ corresponds to the fully disengaged position of the clutch; position $x_1$ corresponds to the fully engaged position of the clutch.

The counting status of incremental sensor 23 that is evaluated on controller 24 and corresponds to a specific position of gear sector 16 may change in the course of operation as a result of different influences, such as wear, temperature, etc., or must, for example, be newly input or compensated after a reset.

For a precise control of the clutch, it is important to know precisely the instantaneous assignment between transmissible clutch torque MK and the position of control element 20. Running against limit stops 26 or 28 is only possible in certain operating states of the vehicle without the vehicle operation being impaired.

According to the invention, provision is made to determine the current clutch torque MK in slip phases according to the following equation:

$$MK = |MM - J \times \bar{\omega}|,$$

MM being the instantaneous torque of the driving engine impinging the input side of the clutch, for example a combustion engine, J being the moment of inertia of the combustion engine, and $\bar{\omega}$ being the change over time of the speed of the crankshaft of the combustion engine or the acceleration of the crankshaft.

Figure 3:
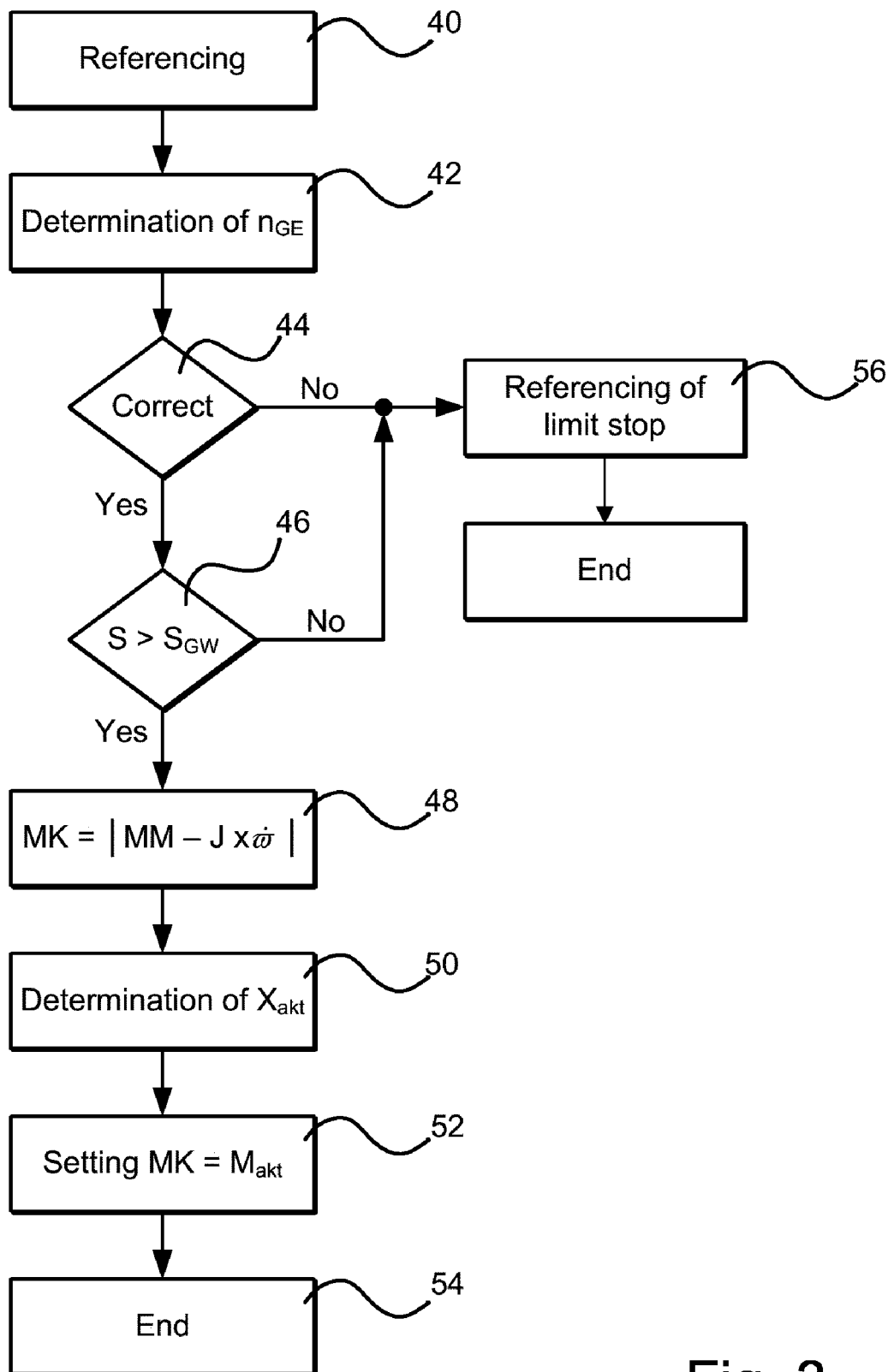

The sequence of a referencing process is explained in reference to the flow diagram of FIG. 3.

In step 40 a program stored in controller 24 starts a referencing cycle. In step 42 the input speed of transmission $n_{GE}$, which is simultaneously the output speed of the clutch, is determined. In step 44, plausibilities, such as the calculated vehicle speed, the instantaneous transmission ratio and the axle ratio (from these quantities the transmission input speed can also be determined), are used to check whether the transmission input speed $n_{GE}$ was correctly calculated. If this is the case, then the program continues to step 46 in which a check is made of whether slip S is larger than a slip limit value $S_{GW}$. The slip is calculated by comparing the engine speed, which is simultaneously the clutch input speed, to the transmission input speed. If the slip is over slip limit value $S_{GW}$, then the transmissible clutch torque MK is calculated using the formula $MK = |MM - J \times \bar{\omega}|$. The engine torque is derived from an engine characteristics family in which the engine torque is stored as a function of the position of a power control element and the speed of the engine as well as in some cases additional influential variables.

In step 50, the current position $X_{akt}$ of the clutch actuation member (in FIG. 2 designated as $x_r$, reference position) is determined on the basis of clutch torque characteristic (FIG. 2) from the clutch torque MK determined in step 48, which in FIG. 2 is called $M_r$ (reference torque). The current position $x_r$ can now be used as a reference position to which the counting of the increment meter 22 (FIG. 1) is related. The reference clutch torque to be targeted, which is stored in a program of control device 24, is set to the current clutch torque, whereupon an abrupt jump in the clutch torque or an abrupt actuation of the clutch may be prevented.

For the case that it is not possible to determine a transmission input speed $n_{GE}$ (No in step 44) or that slip S, which is determined in step 46, is less than or equal to slip limit value $S_{GW}$, the program moves to step 56 in which it is possible to proceed as follows.

If a gear is engaged and the slip is less than slip limit value $S_{GW}$, the clutch may be fully engaged until, in the example of FIG. 1, the position of limit stops 26 and 28 corresponding to the fully engaged position of the clutch has been reached. This position serves as the new reference position.

In order to bring the slip below the slip limit value if necessary, slip S can be reduced to a value lower than the limit value via a motor intervention, e.g., by appropriate drive of an actuator of a loaded control element by means of controller 24. If, during the reduction of the engine torque, the clutch torque is kept constant, the slip drops and a referencing may be accomplished by running against the limit stop corresponding to the fully engaged clutch. In this context the vehicle momentarily loses pulling force; however, this loss of pulling force is substantially smaller than the loss of pulling force associated with a complete disengagement of the clutch and running against the corresponding other limit stop. Furthermore, no gear may be disengaged so that the full pulling force can quickly be restored.

For the case that the transmission input speed cannot be determined, the clutch can be actuated up to one of the limit stops. Next, a reference drive can be carried out in the neutral position of the transmission, it being ensured that no gear is engaged and the transmission sensors can be compensated. Thereafter, the actuation device of the clutch can be referenced by running against the fully engaged or fully disengaged limit stop.

In a parallel shift transmission, if no additional information is known or the validity of the information is not ensured, the compensation must occur in the following way.

Both clutches are tentatively disengaged. In this phase the clutches are actuated in the disengagement direction simultaneously or staggered in time. In so doing, the movement is observed. If there is no more movement as a result of a limit stop, the disengagement is terminated. Through knowledge of the system, it can now be assumed that the clutches are disengaged, i.e., the drive train is disengaged.

Next, a neutral reference run is carried out in which the drive train is disengaged by disengagement of the clutches so that any desired movement may be carried out in the transmission. Using the neutral reference, there is tentative movement and a defined position is run against for reference purposes. In so doing, the transmission sensors can be compensated. Next, both clutches can be compensated or referenced at either one of its limit stops as desired.

Based on FIG. 4, an explanation is given below of how transmission input speed $n_{GE}$ may be determined.

In step $42_1$ a determination is made of whether a sensor for detecting the transmission input speed is present. If so, the transmission input speed $n_{GE}$ is derived directly from the sensor signal in step $42_2$.

If there is no sensor, then the current gear of the transmission is determined and a check is made in step $42_4$ of whether the currently engaged gear $G_{akt}$ could be determined with certainty as gear y. If so, in step $42_5$ the transmission input speed is calculated from the vehicle speed v, the axle ratio $i_A$ and the current gear ratio $i_y$, so that in this way the transmission input speed $n_{GE}$ is also calculated and the determination of the transmission input speed $n_{GE}$ ends in step $42_6$.

If it is determined in step $42_4$ that the instantaneously engaged gear cannot be determined with certainty, then a determination is made in step $42_7$ that transmission input speed $n_{GE}$ cannot be determined via path $42_3$ and $42_4$.

Of course, the results of steps $42_2$ and $42_5$ in step 44 can be compared to each other so that the calculated transmission input speed $n_{GE}$ can be determined with certainty as correct.

Based on FIG. 5, an explanation is given below of how the current gear $G_{akt}$ can be determined in step $42_3$.

Normally, the current gear is known from a gear position sensor mounted on the transmission. After a reset, for example, as a result of an undervoltage, at which point a referencing must occur, the gear position sensor must also be referenced anew, so that from there the instantaneously engaged gear is not known. The RAM area of a memory included in controller 24 frequently has a special "buffered RAM" area whose content is retained when there is a reset and is checked for correctness. However, in a reset due to undervoltage, the buffered RAM is also erased. In order to then be able to determine the current gear, it is saved in the EEPROM after each change of the gear. In order to be able to decide whether the value stored in the EEPROM is valid when there is a request for a compensation of a referencing after an undervoltage reset, an additional signal is required. This additional signal is always set to "no gear" before the disengagement of the old gear is begun and set to "gear" as soon as the new gear is fully engaged and its number has been stored in the EEPROM.

Figure 5:
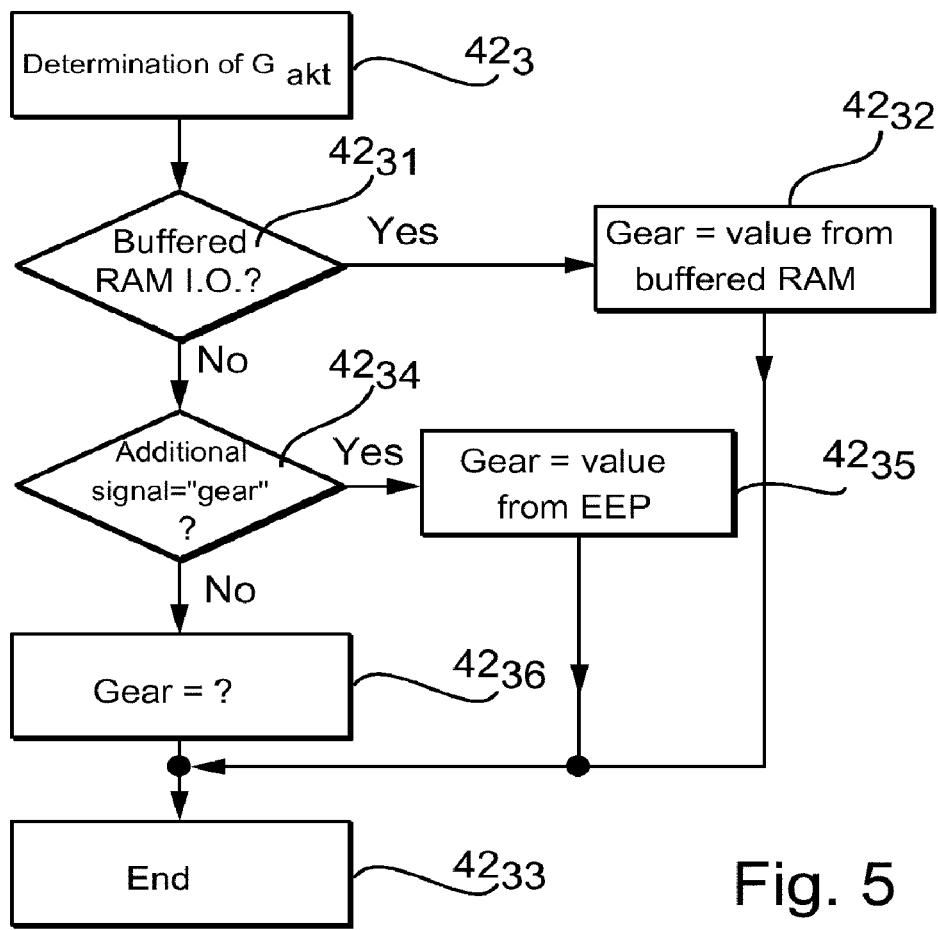

According to FIG. 5, a check is made in step $42_{31}$ of whether the buffered RAM area is in order. If so, then in step $42_{32}$ the gear stored in the buffered RAM is read as the current gear and the gear determination program proceeds to end $42_{33}$. If the buffered RAM is not in order (deleted, for example), then a determination is made in step $42_{34}$ of whether the additional signal is set to "gear". For example, the value of the additional signal set to "gear" is 1 and the value of the additional signal set to "no gear" is 0. If the additional signal is on "gear", then in step $42_{35}$ the current gear is read from the EEPROM and the program is terminated.

Figure 4:
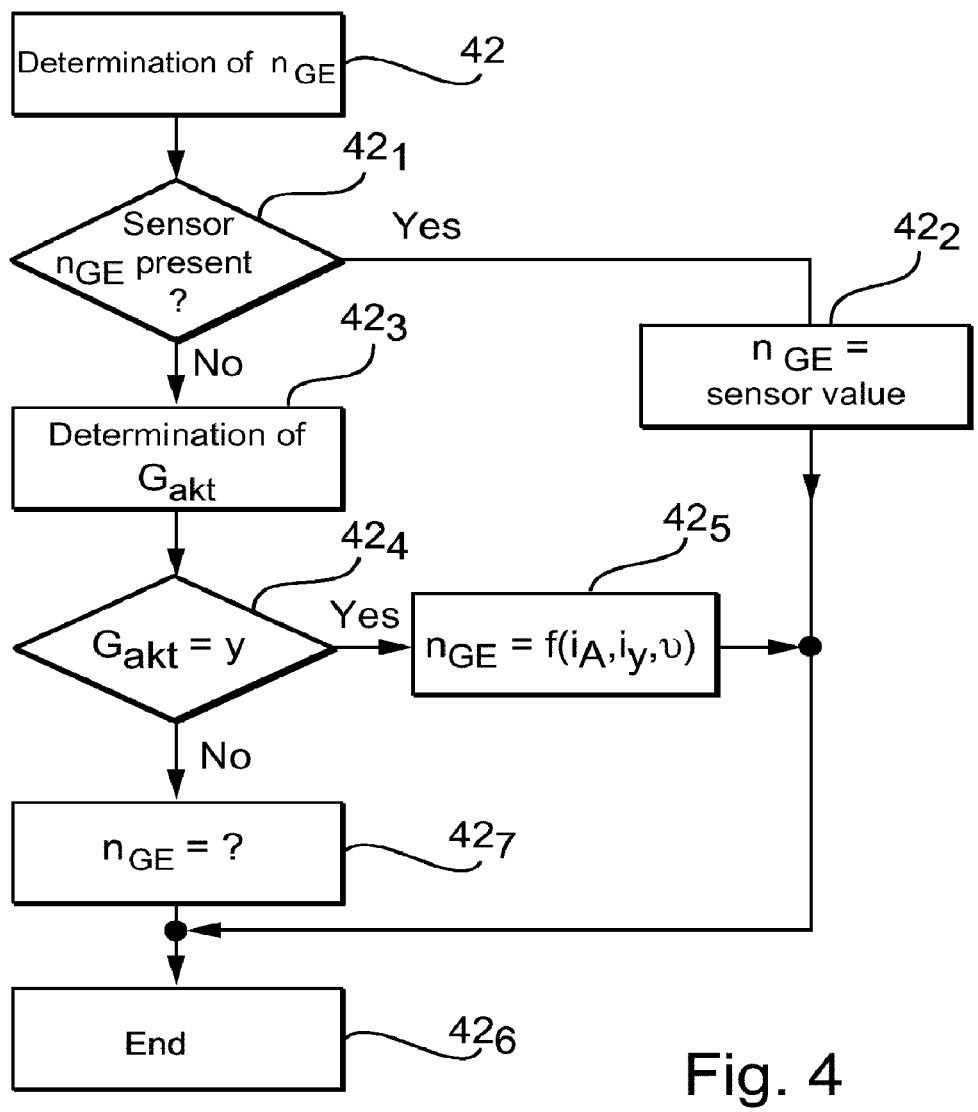

If a determination is made in step $42_{34}$ that the additional signal is on "no gear" then in step $42_{36}$ a determination is made that a certain gear determination is not possible, and, therefore, the transmission input speed cannot be determined in step $42_7$ (FIG. 4).

A quick referencing or a quick compensation of the actuation device is possible to the greatest degree using the exemplary method described above.

The described method can be used not just for a transmission having a single clutch, but also in parallel shift transmission systems.

In order to derive the clutch torque from the engine torque and the product of the moment of inertia of the engine and the angular acceleration of its speed when there is slip that exceeds the threshold in parallel shift transmissions, the following basic prerequisites must be satisfied:

One of the two clutches must be disengaged so that the total engine torque is transmitted via the other clutch, which is slipping; and, In the transmission branch that is downstream from the slipping clutch, one gear must be engaged.

In order to be able to decide at any point in time—in particular also after a reset—whether these basic prerequisites have been satisfied, the corresponding status data can be stored in the buffered RAM and/or EEPROM. In order to take into account the fact that the storage in the EEPROM can last several hundred milliseconds, it is important always to also store information that says whether the information in the EEPROM is valid or not. Before the information is changed in the EEPROM, its validity must be indicated. The invalidity at this point may only be canceled after the change is complete.

When there is an undervoltage reset, the system for actuating an automatic clutch and an automatic transmission no longer recognizes the absolute positions of the particular actuation members, so that a referencing is required. Such a referencing may advantageously be carried out by the clutch first being opened tentatively and the incremental travel sensor assigned to the clutch actuation referenced or compensated when the clutch is completely disengaged. Next, when the clutch is completely disengaged, the transmission can be referenced by its reference positions being run against. Then, the transmission may be shifted into its neutral position and the engaged position of the clutch may be referenced, so that the clutch and transmission actuation devices are once more fully ready for use.

The aforementioned referencing may be used with automatic transmissions operating with one clutch as well as with parallel shift transmissions that operate, for example, with two clutches.

The aforementioned methods may be combined with each other in expedient ways and features of the one method may be used in other methods.

LIST OF REFERENCE CHARACTERS

10 Actuator
12 Worm gearing
14 Spindle
16 Gear sector
18 Transmission member
20 Control element
22 Clutch
23 Incremental travel sensor
24 Control device
26 Limit stop
28 Limit stop

What is claimed is:

1. A method for referencing an incremental travel sensor in an electronically controlled actuation device of a clutch in the drive train of a traveling vehicle, the actuation device containing a memory in which a characteristic curve is stored that indicates the clutch torque as a function of the position of an actuation element, the method comprising the following steps:
   determining whether the clutch is slipping beyond a given threshold; if so
   determining the current clutch torque; and,
   determining the current position of the actuation element based on the current clutch torque and the characteristic curve, wherein the current clutch torque is determined according to the following equation:

$$M_K = |M_M - J \times \vec{\dot{\omega}}|$$

wherein $M_K$=Clutch torque
   $M_M$=Engine torque
   J=Moment of inertia of the engine; and,
   $\vec{\dot{\omega}}$=speed change of the engine over time.

2. The method as described in claim 1, wherein the slip is calculated via a comparison of an engine speed on the clutch input side with a transmission input speed on the clutch output side.

3. The method as described in claim 2, wherein the transmission input speed may be calculated from the instantaneous transmission ratio, the axle ratio and the instantaneous vehicle speed.

4. The method as described in claim 1, wherein the slip is calculated via a comparison of an engine speed on the clutch input side with a transmission input speed on the clutch output side.

5. The method as described in claim 4, wherein the transmission input speed may be calculated from the instantaneous transmission ratio, the axle ratio and the instantaneous vehicle speed.

6. The method as described in claim 1, wherein, after calculation of the current clutch torque, the current reference clutch torque is set to the current clutch torque.

7. The method as described in claim 1, wherein, after calculation of the current clutch torque, the current reference clutch torque is set to the current clutch torque.

8. The method as described in claim 1, wherein a current gear is stored in an EEPROM of the actuation device after the gear is changed.

9. The method as described in claim 8, wherein before the disengagement of an old gear begins an additional signal is set to "no gear" and is set to "gear" after engagement of a new gear.

10. The method as described in claim 1, the method being carried out for the clutches of a parallel shift transmission.

11. A method for referencing an incremental travel sensor in an electronically controlled actuation device of a clutch in the drive train of a traveling vehicle that comprises the following steps:
   determining whether the clutch is slipping beyond a given threshold; if not
   determining whether a gear is engaged; if so,
   completely engaging the clutch until the actuation device reaches an engagement reference limit stop.

12. The method as described in claim 11, wherein a below-threshold slipping state is produced by reducing the engine torque.

13. A method for referencing an incremental travel sensor in an electronically controlled actuation device of a clutch in the drive train of a traveling vehicle comprising the following steps:
   determining whether the clutch is slipping beyond a given threshold; if not,
   determining whether a gear is engaged; if not,
   completely disengaging or engaging the clutch until the actuation device reaches an engagement reference limit stop.

14. A method for referencing an incremental travel sensor in an electronically controlled actuation device of a clutch and at least one additional incremental travel sensor in an electronically controlled actuation device of a transmission in a vehicle drive train after a reset, especially an undervoltage reset, comprising the following steps:
   completely disengaging the clutch and referencing of the incremental travel sensor assigned to the clutch actuation device in the fully disengaged position of the clutch;
   maintaining the fully disengaged position of the clutch and referencing of the incremental travel sensor(s) assigned to the transmission actuation device;
   shifting of the transmission into neutral; and,
   completely engaging the clutch and referencing of the incremental travel sensor assigned to the clutch actuation device in the fully engaged position of the clutch.

15. A device for referencing an incremental sensor (23) in an electronically controlled actuation device (10, 24) of a clutch (22) in the drive train of a vehicle, the actuation device including a microprocessor having a memorizing device in which is stored a characteristic curve that specifies the clutch torque as a function of the position of an actuation element (20) and to which the incremental sensor, other sensors and at least one actuator (10) of the actuator device are connected, programs being stored in the memorizing device in such a manner that the device carries out a method for referencing said incremental travel sensor in said electronically controlled actuation device of said clutch in the drive train of the traveling vehicle, the actuation device memorization device storing a characteristic curve that indicates the clutch torque as a function of the position of said actuation element, the method comprising the following steps:

determining whether the clutch is slipping beyond a given threshold; if so determining the current clutch torque; and, determining the current position of the actuation element based on the current clutch torque and the characteristic curve, wherein the current clutch torque is determined according to the following equation:

$$M_K = |M_M - J \times \overline{\omega}|$$

wherein $M_K$=Clutch torque $M_M$=Engine torque

J=Moment of inertia of the engine; and, $\overline{\omega}$=speed change of the engine over time.

16. A device for referencing an incremental sensor (23) in an electronically controlled actuation device (10, 24) of a clutch (22) in the drive train of a vehicle, the actuation device including a microprocessor having a memorizing device in which is stored a characteristic curve that specifies the clutch torque as a function of the position of an actuation element (20) and to which the incremental sensor, other sensors and at least one actuator (10) of the actuator device are connected, programs being stored in the memorizing device in such a manner that the device carries out a method for referencing said incremental travel sensor in said electronically controlled actuation device of said clutch in the drive train of said traveling vehicle that comprises the following steps:

determining whether the clutch is slipping beyond a given threshold; if not determining whether a gear is engaged; if so, completely engaging the clutch until the actuation device reaches an engagement reference limit stop.

17. A device for referencing an incremental sensor (23) in an electronically controlled actuation device (10, 24) of a clutch (22) in the drive train of a vehicle, the actuation device including a microprocessor having a memorizing device in which is stored a characteristic curve that specifies the clutch torque as a function of the position of an actuation element (20) and to which the incremental sensor, other sensors and at least one actuator (10) of the actuator device are connected, programs being stored in the memorizing device in such a manner that the device carries out a method for referencing said incremental travel sensor in said electronically controlled actuation device of said clutch in the drive train of said traveling vehicle comprising the following steps:

determining whether the clutch is slipping beyond a given threshold; if not, determining whether a gear is engaged; if not, completely disengaging or engaging the clutch until the actuation device reaches an engagement reference limit stop.

18. A device for referencing an incremental sensor (23) in an electronically controlled actuation device (10, 24) of a clutch (22) in the drive train of a vehicle, the actuation device including a microprocessor having a memorizing device in which is stored a characteristic curve that specifies the clutch torque as a function of the position of an actuation element (20) and to which the incremental sensor, other sensors and at least one actuator (10) of the actuator device are connected, programs being stored in the memorizing device in such a manner that the device carries out a method for referencing said incremental travel sensor in said electronically controlled actuation device of said clutch and at least one additional incremental travel sensor in said electronically controlled actuation device of said transmission in said vehicle drive train after a reset, especially an undervoltage reset, said method comprising the following steps:

completely disengaging the clutch and referencing of the incremental travel sensor assigned to the clutch actuation device in the fully disengaged position of the clutch;

maintaining the fully disengaged position of the clutch and referencing of the incremental travel sensor(s) assigned to the transmission actuation device;

shifting of the transmission into neutral; and, completely engaging the clutch and referencing of the incremental travel sensor assigned to the clutch actuation device in the fully engaged position of the clutch.

\* \* \* \* \*

UNITED STATES PATENT AND TRADEMARK OFFICE
CERTIFICATE OF CORRECTION

PATENT NO. : 7,424,356 B2
APPLICATION NO. : 11/160678
DATED : September 9, 2008
INVENTOR(S) : Jung et al.

It is certified that error appears in the above-identified patent and that said Letters Patent is hereby corrected as shown below:

In Claim 15, lines 22-26 of column 9, the symbol " $\varpi$ " was inadvertently used in place of the symbol " $\dot{\varpi}$ "

A corrected version of Claim 15 from lines 22-26 of column 9 is presented below:

$$M_K = |M_M - J \times \dot{\varpi}|$$

wherein  $M_K$ = Clutch torque $M_M$ = Engine torque

J = Moment of inertia of the engine; and, $\dot{\varpi}$ = speed change of the engine over time.

Signed and Sealed this

Third Day of March, 2009

JOHN DOLL
*Acting Director of the United States Patent and Trademark Office*